US008736487B2

(12) United States Patent
Jambulingam et al.

(10) Patent No.: US 8,736,487 B2
(45) Date of Patent: May 27, 2014

(54) METHOD AND APPARATUS OF USING HEIGHT AIDING FROM A CONTOUR TABLE FOR GNSS POSITIONING

(75) Inventors: Shreeram Jambulingam, Gilbert, AZ (US); Mangesh Chansarkar, Irvine, CA (US)

(73) Assignee: CSR Technology Inc., San Jose, CA (US)

( * ) Notice: Subject to any disclaimer, the term of this patent is extended or adjusted under 35 U.S.C. 154(b) by 234 days.

(21) Appl. No.: 13/239,318

(22) Filed: Sep. 21, 2011

(65) Prior Publication Data

US 2013/0069821 A1 Mar. 21, 2013

(51) Int. Cl.
*G01S 19/40* (2010.01)
(52) U.S. Cl.
USPC .................................................. 342/357.23
(58) Field of Classification Search
USPC .................................................. 342/357.23
See application file for complete search history.

(56) References Cited

U.S. PATENT DOCUMENTS

| | | | |
|---|---|---|---|
| 5,202,829 A | 4/1993 | Geier | |
| 5,477,459 A | 12/1995 | Clegg et al. | |
| 5,731,978 A | 3/1998 | Tamai et al. | |
| 5,862,511 A | 1/1999 | Crovle et al. | |
| 5,987,378 A | 11/1999 | Schipper et al. | |
| 6,014,101 A | 1/2000 | Loomis | |
| 6,055,477 A | 4/2000 | McBurney et al. | |
| 6,061,018 A | 5/2000 | Sheynblat | |
| 6,081,230 A | 6/2000 | Hoshino et al. | |
| 6,202,023 B1 | 3/2001 | Hancock et al. | |
| 6,271,788 B1 | 8/2001 | Longaker et al. | |
| 6,317,683 B1 | 11/2001 | Ciprian et al. | |
| 6,369,755 B1 | 4/2002 | Nichols et al. | |
| 6,373,432 B1 | 4/2002 | Rabinowitz et al. | |
| 6,392,589 B1 | 5/2002 | Rogers et al. | |
| 6,429,814 B1 | 8/2002 | Van Diggelen et al. | |
| 6,469,663 B1 | 10/2002 | Whitehead et al. | |

(Continued)

FOREIGN PATENT DOCUMENTS

| | | |
|---|---|---|
| CN | 1383493 | 12/2002 |
| EP | 2093586 | 8/2009 |

(Continued)

OTHER PUBLICATIONS

British Search Report issued Nov. 16, 2012 in corresponding application.

(Continued)

*Primary Examiner* — Harry Liu
(74) *Attorney, Agent, or Firm* — Pillsbury Winthrop Shaw Pittman LLP

(57) ABSTRACT

The present invention is related to location positioning systems, and more particularly, to a method and apparatus for making accuracy improvements to a GPS receiver's navigation calculations. According to a first aspect, the invention includes maintaining a table of height attributes for major cities and urban areas around the world (contour table) in the GNSS chipset. The information in the table preferably includes latitude, longitude of the city along with height attributes of those cities, such as the average, min, max height and region boundary etc. Additional information such as average gradient could also be saved in the table. According to further aspects, when GPS signals are degraded in environments such as urban canyons, the height information can be obtained from the table and used to improve the navigation solution.

21 Claims, 2 Drawing Sheets

(56) References Cited

U.S. PATENT DOCUMENTS

| | | |
|---|---|---|
| 6,496,778 B1 | 12/2002 | Lin |
| 6,505,146 B1 | 1/2003 | Blackmer |
| 6,526,352 B1 | 2/2003 | Breed et al. |
| 6,552,681 B1 | 4/2003 | Hayward et al. |
| 6,643,587 B2 | 11/2003 | Brodie et al. |
| 6,756,938 B2 | 6/2004 | Zhao et al. |
| 7,031,983 B2 | 4/2006 | Israni et al. |
| 7,299,056 B2 | 11/2007 | Anderson |
| 7,512,505 B2 | 3/2009 | Harles |
| 8,125,376 B1 * | 2/2012 | Ashjaee et al. .......... 342/357.23 |
| 2002/0050944 A1 * | 5/2002 | Sheynblat et al. ....... 342/357.06 |
| 2003/0052777 A1 | 3/2003 | Bleier |
| 2003/0125877 A1 | 7/2003 | Hanson |
| 2003/0148761 A1 | 8/2003 | Gaal |
| 2003/0167121 A1 | 9/2003 | Ockerse et al. |
| 2004/0181335 A1 | 9/2004 | Kim et al. |
| 2005/0027450 A1 | 2/2005 | Cox et al. |
| 2005/0192024 A1 | 9/2005 | Sheynblat |
| 2008/0243378 A1 * | 10/2008 | Zavoli ........................... 701/209 |
| 2010/0306454 A1 * | 12/2010 | Cheng ........................... 711/103 |
| 2011/0241935 A1 | 10/2011 | Miocinovic et al. |

FOREIGN PATENT DOCUMENTS

| | | |
|---|---|---|
| JP | 2005026678 | 1/2005 |
| JP | 2005099680 | 4/2005 |
| JP | 2006176243 | 7/2006 |
| JP | 2007134085 | 5/2007 |
| JP | 2008151611 | 7/2008 |
| WO | WO 99/57575 | 11/1999 |
| WO | WO 02/41027 | 5/2002 |
| WO | 2011/107964 | 9/2011 |

OTHER PUBLICATIONS

Ptasinski, et al., "Altitutde Aiding for GPS Systems Using Elevation Map Datasets", Journal of Navigation, Cambridge University Press, vol. 55, No. 3, pp. 451-462, (Sep. 2002).

Van Nee, et al., "New Fast GPS Code-Acquisition Using FFT", Electronic Letters, vol. 27, No. 2, pp. 158-160 (1991).

Van Nee, et al., "Novel Fast GPS/GLONASS Code Acquisition Technique Using Low Update Rate FFT", Electronic Letters, vol. 28, No. 9, pp. 863-865 (1992).

MacGougan, et al., "Degraded GPS Signal Measurements With A Stand-Alone High Sensitivity Receiver", ION National Technical Meeting, San Diego, Jan. 28-30, 2002.

Garin, et al., "Wireless Assisted GPS-SiRF Architecture and Field Test Results", Proc. Of Inst. Of Navigation ION GPS-99, pp. 489-497 (Sep. 14-17, 1999 Nashville, TN).

Moeglein, et al., "An Introduction to SnapTrackTM Server Aided GPS Technology", Proc. Of Navigation ION GPS-98, pp. 333-342 (Sep. 15-18, 1998, Nashville, TN).

Stephen, et al., "Development and Testing of a GPS-Augmented Multi Sensor Vehicle Navigation System", The Journal of Navigation, vol. 54, pp. 297-319 (2001).

"National Imagery and Mapping Agency Performan Specification-Digital Terrain Elevation Data", MIL-PRF-89020A Apr. 19, 1996, Defense Mapping Agency, (1996), pp. 1-40.

Excerpts from htt://earth-info.nga.mil website provided by National Tech, Alliance and NGA, "WGS 1984 Earth Gravitational Model Metadeta", including abstract, downloaded from http://earth-info.nga.mil/GandG/wgs84/gravitymodel/wgs84_180/wgs84-md.htm on Jul. 25, 2005.

Excerpts from htt://earth-info.nga.mil website provided by National Tech, Alliance and NGA, "NGA/NASAEGM96, N=M=360 Earth Grav. Model: WGS 84 EGM 96 15- Min Geold Height File and Coefficient File", as described in http://earth-info-nga.mil/GanG/wgs84/gravitymod/egm96/egm.htm on Jul. 25, 2005 believed to describe a 1996 model.

"The Land Process Distributed Active Archive Center Online GTOPO30 Documentation", US Geological Survey, EROS Data Center, 1996, http://edcdaac.usgs.gov.

Golub, et al., "Matrix Computations, $2^{nd}$ Ed.," pp. 218-220 (1989).

Kaplan, et al, "Understanding GPS Principles and Applications", Artech House, Section 2.2.3.1 pp, 25-27, (1996).

Schwarz, et al, "Fundamentals of Geodesy", Lecture Notes ENSU 421, Dept. of Deomatics Engineering, Univ. of Calgery, AB, CAN, Sec. 3.2, p. 26, (1994).

* cited by examiner

METHOD AND APPARATUS OF USING HEIGHT AIDING FROM A CONTOUR TABLE FOR GNSS POSITIONING

FIELD OF THE INVENTION

The present invention is related to location positioning systems, and more particularly, to a method and apparatus for using height aiding from a contour table to obtain or improve a GNSS positioning solution.

BACKGROUND OF THE INVENTION

With the development of radio and space technologies, several satellites based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In environments where satellite signals are degraded, however, a GPS receiver often encounters problems in locking onto the signals that are needed for the calculation of position, velocity, altitude, and time. In a degraded signal environment, satellite signals can be weak or otherwise difficult for GPS receivers to lock on to. One example of a degraded signal environment is a tunnel through which a car equipped with a GPS receiver is driving. While the GPS receiver is in the tunnel, the satellite signals are completely obstructed and no lock can be acquired. As a result, the GPS receiver cannot accurately calculate its position and other navigational data (such as velocity, altitude, and time) while the car is in the tunnel. In addition, because GPS receivers typically utilize positioning algorithms that use navigational filters that account for the GPS receivers' last-known positions, the GPS receiver's position calculation when the car emerges from the tunnel can also be less accurate since accurate position calculations were not performed during the time that the car was in the tunnel.

Degraded signal environments are often encountered in urban areas, such as cities with many tall buildings. A city with many tall buildings contains "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas.

One way to improve the accuracy of a calculated GPS position is to make accuracy improvements with the aid of a map database. For example, personal navigation devices (PNDs) such as those available from Garmin and other manufacturers typically include extensive map databases covering entire countries or regions to provide real-time position displays and turn-by-turn directions among other things. Some attempts have been made to provide info from this map database back to the GPS receiver in real-time to aid in the receiver's navigation solution. However, this has been difficult to implement in practice because of the delays involved in the communications between the receiver and other PND components, for example. Another problem with this approach is that the accuracy improvements are limited because the accuracy improvements are performed only after the GPS position has already been calculated. A further problem is the amount of memory space needed to store map data for all points on the Earth.

The accuracy problem can also be addressed using network aiding in some devices having a combo chipset that does both location and connectivity. In other cases, the Navigation engine may hold onto a certain height (say 0 meters or mean sea level (MSL)) and compute a position solution. However, these attempted solutions also have drawbacks in added complexity and cost or reduced accuracy and performance.

Accordingly, a method and apparatus for making better accuracy improvements to a GPS receiver's position calculations in degraded signal environments remain desirable.

SUMMARY OF THE INVENTION

The present invention is related to location positioning systems, and more particularly, to a method and apparatus for making accuracy improvements to a GPS receiver's navigation calculations. According to a first aspect, the invention includes maintaining a table of height attributes for selected areas around the world (contour table) in the GNSS chipset. The information in the table preferably includes latitude, longitude of the city along with height attributes of those cities, such as the average, min, max height, etc. Additional information such as average gradient could also be saved in the table. According to further aspects, when GPS signals are degraded in environments such as urban canyons, the height information can be obtained from the table and used to improve the navigation solution.

In furtherance of these and other aspects, an exemplary method of employing a contour table for positioning includes retrieving height information stored in a contour table associated with the GPS receiver; and computing a position fix of the GPS receiver by using the retrieved height information.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
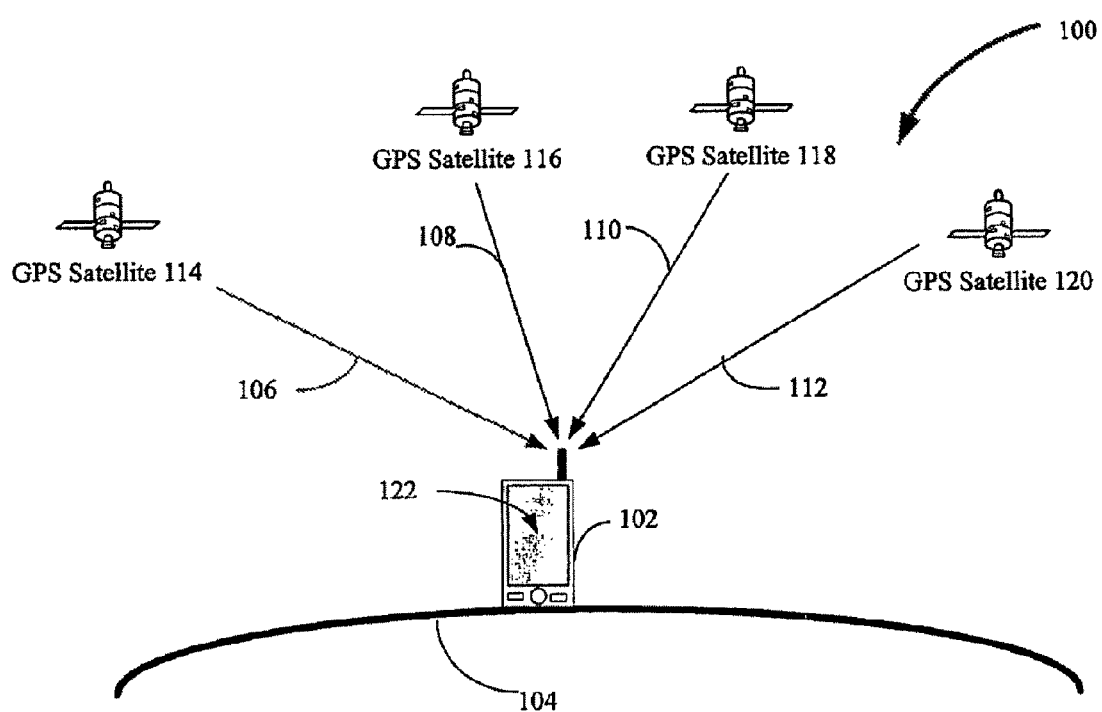
FIG. 1 is a block diagram of an example implementation of principles of the invention.

FIG. 1 illustrates an example implementation of embodiments of the invention. As shown in FIG. 1, GPS satellites (i.e. SVs) 114, 116, 118 and 120 broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cellular or other type of telephone with built-in GPS functionality (e.g. iPhone, Blackberry, Android smartphone), or any GPS device embedded in tracking applications (e.g. automotive tracking from Trimble, package or fleet management tracking from FedEx, child locator tracking applications etc).

Receiver 122 can be implemented using any combination of hardware and/or software, including GPS chipsets such as SiRFstarIII GSD3tw or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the navigation solution improvement techniques of the present invention after being taught by the present specification.

The present inventors recognize that the need for accurate location assistance during city driving is an especially acute need. However, in most major cities around the world, tall structures restrict a receiver's visibility to the GNSS satellites in the sky. Hence many times in urban canyons, navigation devices are limited to computing GPS fixes with a minimal set of satellites. Since the vertical dilution of precision (DOP) is usually large in these situations, the height computed in these cases is prone to large errors. An error in height will then result in a large position error. Hence, getting an accurate height is desirable for getting a good position solution in urban areas. According to some aspects, therefore, the invention recognizes that obtaining an alternate source of height aiding to the navigation engine would assist in arriving at a good position solution.

The present inventors further recognize that one obstacle to obtaining height aiding information from a stored table is the amount of storage space needed to store height table for all points on the Earth. According to further aspects, therefore, the invention is designed to work in places where there are often the most problems, such as urban areas. Hence embodiments of the invention are able to restrict the size of the contour table (e.g. saving ROM space) while providing height aiding where it is needed the most (e.g. places of limited visibility to the sky).

According to general aspects, therefore, the invention includes maintaining a table of height attributes (i.e. contour table) for selected areas of the world in the GNSS chipset. The information in the table preferably includes a listing of selected locations, along with one or more height attributes of those locations, such as the average, min, max height, etc. Additional information such as average gradient could also be saved in the table.

In embodiments, the selected locations can be specific latitude, longitude coordinates. In other embodiments, the selected locations can be defined by latitude, longitude boundaries (e.g. rectangular areas). Many variations are possible. In case of mid sized and large urban areas (e.g. Los Angeles, New York, etc) or in places where there is a large height variation, multiple entries for height can be used. In these cases, height at intermediate positions could be computed using interpolation.

In one embodiment, the embedded contour table is stored in non-volatile (e.g. flash, ROM, etc.) memory that is readily accessible by the GPS receiver (e.g. receiver 122). In another embodiment, the embedded contour table is stored in on-chip memory on the same chip as the GPS receiver. In this and other embodiments, the embedded contour table could be downloaded from the memory (volatile/non-volatile) of a host processor in a tracker/host framework.

The embedded contour table contains height information which may also be contained in map databases in conventional Personal Navigation Devices (PNDs), where the map databases are external to the GPS receivers in the PNDs. Map databases in PNDs, however, generally contain detailed cartography information for regions spanning a country or a continent and are consequently very large in size (at least several gigabytes). For similar reasons as discussed previously, it may be impractical and inefficient to embed such large map databases wholesale into a GPS receiver for the purpose of improving the accuracy of the GPS receiver's position calculations. Therefore, as mentioned above, according to certain aspects of the invention, the contour table embedded on the GPS receiver is reduced to a size smaller than that of a typical map database in a PND in a manner optimized for the purpose of improving the accuracy of the GPS receiver's position calculations.

In embodiments, a contour table embedded within a GPS receiver contains height information only for locations that have substantially different elevations than a default elevation used by the navigation solution (e.g. sea level) when no height information is otherwise available. For example, height information for coastal regions near sea level may be excluded from the embedded map table.

In embodiments, a contour table embedded within a GPS receiver contains height information for only locations where table information is likely to be needed most often. One type of such locations includes those that contain degraded signal environments. In a degraded signal environment, satellite signals are weak or otherwise difficult for GPS receivers to extract information from. Which geographic regions are likely to contain degraded signal environments may be determined beforehand. In some embodiments, the embedded contour table may contain little or no height information on geographic regions other than those that have been identified as likely to contain degraded signal environments, thereby reducing the size of the embedded contour table. Since urban areas are likely to contain degraded signal environment due to the densely located and often tall buildings in urban areas, the embedded map database may contain height information only for selected urban areas. For example, the embedded contour table may only contain height information for the top twenty-five or fifty metropolitan areas in the United States. In an embodiment, the embedded contour table further excludes height information for locations that a user is not likely to go to, such as remote areas and high mountains such as Mt. Everest.

The information from the table could be obtained and used by a GPS receiver in various ways, and could depend on the information stored therein, and the particular circumstances, for example. Various possible embodiments will now be described in more detail.

In one example embodiment, information from the table is used as an additional measurement in the solution for position fix. In this case, the uncertainty associated with the height measurement could depend on the minimum and maximum heights for that region as reported in the contour table.

Figure 2:
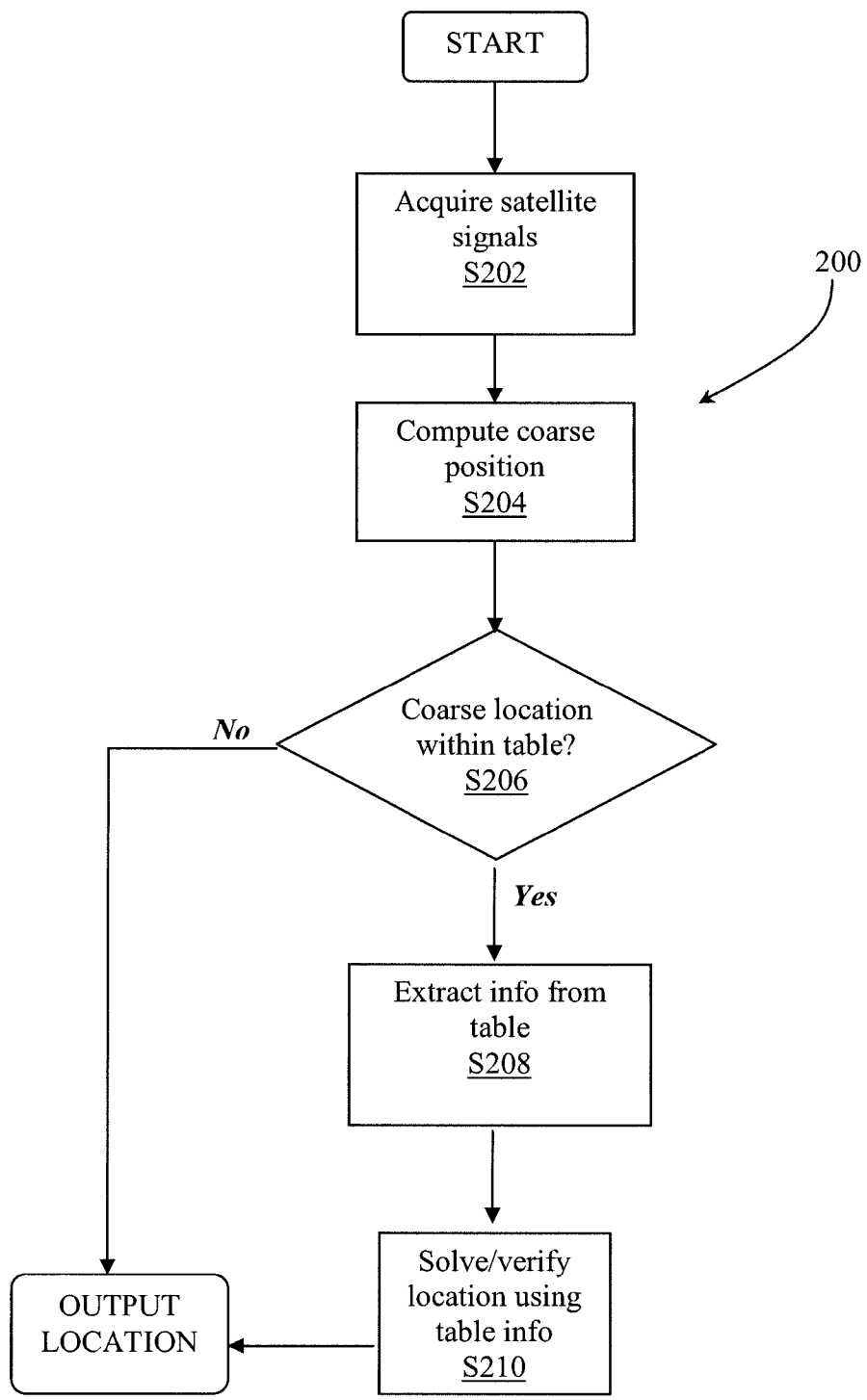
FIG. 2 is a flowchart illustrating an example methodology for using contour table information for a positioning solution in accordance with aspects of the invention.

A possible implementation 200 of this embodiment is illustrated in FIG. 2. As shown in FIG. 2, signals from satellites are acquired and processed in step S202. As is known, signals from a minimum of three GNSS satellites are needed to compute a two-dimensional position (i.e. latitude/longitude), whereas signals from a minimum of four GNSS satellites are needed to computer a three-dimensional position (i.e. latitude/longitude/height).

Using these signals, a coarse position is computed in step S204 (e.g. lat, long, height), for example using pseudoranges to acquired satellites and triangulation techniques well known to those skilled in the art. In another embodiment, the coarse position in step S204 could come from a network as assistance, or from other coarse positioning methods such as wi-fi positioning or cell-id positioning. In cases where only three GNSS signals are acquired, the coarse position is computed in two dimensions, and a best estimate of the height that is known is used to complete the three dimensional coarse position. If at least four GNSS signals are acquired, the three-dimensional coarse position is computed from the measurements.

The coarse position is compared to locations in the table in step S206. In some embodiments this could be done, for example, only whenever the receiver computes a minimally determined position solution (e.g. when signals for only three or four satellites are available), and/or using other criteria such as DOP and SNR thresholds for acquired signals. If the coarse position computed in step S204 matches any entries in the contour table, then the information for that location is extracted in step S208.

There are many ways the comparison in step S206 can be made, and it can depend on how information is stored in the table. In embodiments, information can be stored for specific latitude, longitude coordinates, and a comparison can be made to determine whether the coarse position is within a certain distance from these coordinates. The distance in such cases could vary as a function of the absolute height of the location. For example, if the height is large the distance for comparison could be large, while if the height is low, the distance for comparison would be small. In other embodiments, information in the table can be stored for selected locations which are defined by latitude, longitude boundaries (e.g. square or rectangular areas). In this case, the coarse position is compared to these boundaries and a match is identified if the coarse position falls completely within these boundaries. Many variations are possible.

If step S206 determines that the coarse position has a matching entry, information for that location is extracted from the table in step S208. In embodiments, the information is simply a height value for the matching two-dimensional location. In other embodiments, such as in the case of mid sized and large urban areas (e.g. Los Angeles, New York, etc) or in places where there is a large height variation, multiple entries can be included in the table. In these cases, a height value for the coarse location could be computed from these multiple entries using interpolation. In still further embodiments, additional information such as height uncertainty, minimum and maximum heights, etc. can also be retrieved for the coarse position.

The information extracted from the contour table is used in step S210. In one example, the information is used to improve the accuracy for a minimally computed position. Where the information obtained from the satellites includes their locations and pseudoranges, the latitude and longitude from the coarse position is combined with the height information from the table and used to place a pseudolite at the center of the earth at an associated pseudorange corresponding to the height information from the table. Conventional triangulation techniques are then used to solve for position, in the same manner as if all the information was obtained from satellites.

Additional processing can also be performed in step S210, depending on the information in the table. For example, if the information in the table includes height uncertainty, the position uncertainty can also be computed in step S210.

In an alternative example of processing performed in step S210, the height information from the table is used to solve for a two-dimensional position and clock using the satellite measurements. In other words, the height is assumed to be a known value, and the unknown values of latitude, longitude and clock are solved for using the satellite measurements and well known techniques to those of skill in the art.

In yet another alternative example of processing performed in step S210, the information from the table is used to cross-check the position solution when the coarse position is overly determined. For example, the information from the table is used to obtain a pseudorange to a pseudolite at the center of the earth, and substituted in for one of the satellite measurements to ensure the computed coarse position is within a predetermined tolerance for error.

In still another example of processing performed in step S210, information from the contour table includes fields such as average gradient, maximum gradient, etc. This information can be used, for example, when the receiver is moving. In this case a series of computed positions can be compared to the gradient information to determine whether the computed positions have a change in height that are consistent with the known gradient information.

In embodiments, information from the contour table can be used during navigation, in addition to or alternatively to being used for position fix. Further details regarding example implementations of integrating height information from an embedded contour table in a navigational filter in a GPS receiver's positioning algorithm are described in more detail below.

In one example implementation, height information is added to the embedded map information and additionally used to tune the navigation filters in the manner described in co-pending application Ser. No. 12/409,315, the contents of which are incorporated by reference herein. The co-pending application describes how horizontal map information (i.e. latitude, longitude) is used to tune the navigation filters, and those skilled in the art will understand how to extend the principles of that application to include height information as described in the present application.

In embodiments, the navigation filter is a Kalman filter, and a state vector of the Kalman filter is updated based on an intersection position. In urban canyon environments, the view of the sky is limited by buildings such that the list of visible satellites for a GPS receiver usually only contain satellites directly above and the along the longitudinal direction of travel of the GPS receiver. When the GPS receiver is located in an intersection, however, additional satellites in the lateral direction become visible. This event of detecting more visible satellites in the lateral direction may be correlated to the position of the intersection in the embedded map database. A map database attribute may be stored for this correlation.

The intersection position may be provided as a measurement update for the horizontal and vertical position elements of the state vector of the KALMAN FILTER. The vector used as the measurement update contains unity terms corresponding to the horizontal and vertical position components and zeros for rest of the elements in state vector. Furthermore, terms corresponding to uncertainty for the horizontal and vertical position elements in the R matrix (measurement noise matrix) of the Kalman filter may also be updated with the uncertainty of the intersection position.

It should be noted that the use of the contour table for a navigation solution is not limiting. The contour table could also be used to get height for position obtained from other network based positioning methods such as WiFi and Cell-ID positioning.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for determining a position of a GPS receiver, the method comprising:
   at the GPS receiver:
      computing a coarse estimate of an absolute position of the GPS receiver using GNSS signals;
      retrieving height information stored in a contour table associated with the GPS receiver using the coarse estimate; and
      computing a final estimate of the absolute position of the GPS receiver by using the retrieved height information and the GNSS signals.

2. A method according to claim 1, wherein retrieving height information includes:
   comparing the coarse estimate of the absolute position with entries in the contour table, each entry comprising height information for a corresponding location; and
   finding one or more matching entries in the contour table.

3. A method according to claim 2, wherein computing the coarse estimate of the absolute position includes using pseudoranges for satellites whose GNSS signals are acquired by the GPS receiver.

4. A method according to claim 2, wherein computing the coarse estimate of the absolute position includes receiving assistance data from a network.

5. A method according to claim 2, wherein computing the coarse estimate of the absolute position includes performing cell-ID positioning.

6. A method according to claim 2, wherein computing the coarse estimate of the absolute position includes performing wi-fi positioning.

7. A method according to claim 3, wherein the acquired signals consist of signals from three satellites, and the coarse estimate of the absolute position is a minimally computed position.

8. A method according to claim 2, wherein comparing includes comparing a position associated with one of the entries to determine whether it is within a predetermined distance of the coarse estimate of the absolute position.

9. A method for determining a position of a GPS receiver, the method comprising:
   at the GPS receiver:
      retrieving height information stored in a contour table associated with the GPS receiver; and
      computing a position fix of the GPS receiver by using the retrieved height information, wherein retrieving height information includes:
         computing a coarse position;
         comparing the coarse position with entries in the contour table, each entry comprising height information for a corresponding location, wherein comparing a position associated with one of the entries to determine whether it is within a predetermined distance of the coarse position, wherein the predetermined distance is adjusted based on a height of the coarse position; and
         finding one or more matching entries in the contour table.

10. A method according to claim 2, wherein comparing includes determining whether the coarse estimate of the absolute position falls within a boundary associated with one of the entries.

11. A method according to claim 2, wherein finding includes identifying a plurality of height values respectively associated with different locations, the method further comprising interpolating, using the plurality of height values, to determine the retrieved height information.

12. A method according to claim 1, wherein computing the final estimate of the absolute position includes placing a pseudolite at a pseudorange corresponding to the retrieved height information and solving for the final estimate using the pseudorange together with pseudoranges associated with the GNSS signals.

13. A method according to claim 1, wherein computing the final estimate of the absolute position includes improving the accuracy of the coarse estimate of the absolute position by including the height information as another measurement in a position solution together with measurements from acquired satellite signals.

14. A method according to claim 1, wherein the retrieved height information includes height uncertainty, the method further comprising computing a position uncertainty associated with the final estimate of the absolute position.

15. A method according to claim 1, wherein computing the final estimate of the absolute position includes solving for two-dimensional position and clock.

16. A method according to claim 2, wherein the coarse estimate of the absolute position is an overly determined solution, and wherein computing the final estimate of the absolute position includes cross-checking the coarse estimate of the absolute position using the height information to determine whether the coarse estimate of the absolute position is within a predetermined tolerance.

17. A method according to claim 1, wherein the height information includes gradient information, and wherein the computed final estimate of the absolute position is compared with a previously computed position to determine consistency with the gradient information.

18. A method according to claim 1, further comprising using the retrieved height information to tune navigation filters of the GPS receiver.

19. A device, comprising:
a contour table; and
a GPS receiver coupled to the contour table, the GPS receiver including a processor that is programmed to perform a method comprising:
 computing a coarse estimate of an absolute position of the GPS receiver using GNSS signals;
 retrieving height information stored in a contour table associated with the GPS receiver using the coarse estimate; and
 computing a final estimate of the absolute position of the GPS receiver by using the retrieved height information and the GNSS signals.

20. A device according to claim 19, wherein contents of the contour table are constrained to a plurality of predetermined locations.

21. A method according to claim 1, wherein the retrieved height information is a height value for the coarse estimate of the absolute position.

\* \* \* \* \*

UNITED STATES PATENT AND TRADEMARK OFFICE
CERTIFICATE OF CORRECTION

PATENT NO. : 8,736,487 B2
APPLICATION NO. : 13/239318
DATED : May 27, 2014
INVENTOR(S) : Jambulingam et al.

Page 1 of 1

It is certified that error appears in the above-identified patent and that said Letters Patent is hereby corrected as shown below:

On the Title Page

On Page 2, Item (56), under "OTHER PUBLICATIONS", in Column 1, Line 1, delete ""Altitutde" and insert -- "Altitude --, therefor.

On Page 2, Item (56), under "OTHER PUBLICATIONS", in Column 2, Line 18, delete "Performan" and insert -- "Performance --, therefor.

On Page 2, Item (56), under "OTHER PUBLICATIONS", in Column 2, Line 26, delete "htt://" and insert -- http:// --, therefor.

On Page 2, Item (56), under "OTHER PUBLICATIONS", in Column 2, Line 23, delete "Metadeta"," and insert -- Metadata", --, therefor.

On Page 2, Item (56), under "OTHER PUBLICATIONS", in Column 2, Line 26, delete "htt://" and insert -- http:// --, therefor.

On Page 2, Item (56), under "OTHER PUBLICATIONS", in Column 2, Line 28, delete "Geold" and insert -- Geoid --, therefor.

On Page 2, Item (56), under "OTHER PUBLICATIONS", in Column 2, Line 39, delete "Deomatics" and insert -- Geomatics --, therefor.

On Page 2, Item (56), under "OTHER PUBLICATIONS", in Column 2, Line 39, delete "Calgery," and insert -- Calgary, --, therefor.

In the Claims

In Column 8, Lines 35-36, in Claim 9, delete "comparing a position" and insert -- comparing includes comparing a position --, therefor.

Signed and Sealed this
Ninth Day of September, 2014

Michelle K. Lee
*Deputy Director of the United States Patent and Trademark Office*